United States Patent
Chen

(10) Patent No.: US 12,236,270 B2
(45) Date of Patent: Feb. 25, 2025

(54) MULTI-TASKING CHIP AND RESOURCE CONTROL MANAGEMENT METHOD THEREOF

(71) Applicant: REALTEK SEMICONDUCTOR CORP., Hsinchu (TW)

(72) Inventor: Tsan-Lin Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 591 days.

(21) Appl. No.: 17/496,071

(22) Filed: Oct. 7, 2021

(65) Prior Publication Data
US 2022/0114021 A1 Apr. 14, 2022

(30) Foreign Application Priority Data
Oct. 12, 2020 (TW) .................. 109135246

(51) Int. Cl.
G06F 9/50 (2006.01)
G06F 21/44 (2013.01)

(52) U.S. Cl.
CPC ............ G06F 9/5005 (2013.01); G06F 21/44 (2013.01); G06F 2209/503 (2013.01)

(58) Field of Classification Search
CPC .................................................. G06F 9/5005
See application file for complete search history.

(56) References Cited

U.S. PATENT DOCUMENTS

| | | | |
|---|---|---|---|
| 8,612,772 B1* | 12/2013 | Langhammer .......... | G06F 21/76 711/170 |
| 2007/0260663 A1* | 11/2007 | Frigo ...................... | G06F 7/506 708/490 |
| 2016/0139639 A1* | 5/2016 | Dash ...................... | G06F 1/3221 713/320 |
| 2018/0011745 A1* | 1/2018 | Mundar ................. | G06F 9/5005 |
| 2019/0138302 A1* | 5/2019 | Kasagi ................. | G06F 13/4221 |
| 2020/0036394 A1* | 1/2020 | Shinohara .......... | H03M 13/1185 |

* cited by examiner

*Primary Examiner* — Kevin L Young
*Assistant Examiner* — Carina Yun
(74) *Attorney, Agent, or Firm* — Birch, Stewart, Kolasch & Birch, LLP

(57) ABSTRACT

An integrated circuit includes a plurality of control circuits and a resource controller. Each of the control circuits is configured to send a work request, execute a work procedure according to an authorization code corresponding to the work procedure, and generate a completion signal after the work procedure is completed. The resource controller includes a storage circuit stores a plurality of index values; a processor circuit updates, according to each of the completion signals, a status of the index value associated with the authorization code corresponding to the work procedure; and a conversion circuit configured to, in response to each of the work requests, output, when a status of at least one of the index values is resource-available, an authorization code associated with one index value whose status is resource-available.

14 Claims, 5 Drawing Sheets

| Index value | Authorization code |
|---|---|
| 200_0 | 000 |
| 200_1 | 001 |
| 200_2 | 010 |
| 200_3 | 011 |
| 200_4 | 100 |
| 200_5 | 101 |
| 200_6 | 110 |
| 200_7 | 111 |

MULTI-TASKING CHIP AND RESOURCE CONTROL MANAGEMENT METHOD THEREOF

CROSS-REFERENCE TO RELATED APPLICATION

This non-provisional application claims priority under 35 U.S.C. § 119(a) to Patent Application No. 109135246 filed in Taiwan, R.O.C. on Oct. 12, 2020, the entire contents of which are hereby incorporated by reference.

BACKGROUND

Technical Field

The present invention relates to a multi-tasking technology, and in particular, to a multi-tasking resource management and control chip and a method thereof.

Related Art

Generally, when a single chip is in operation, due to the limited hardware resources in the chip, the chip cannot unlimitedly authorize a processor in the chip to perform multi-tasking. Therefore, the chip controls the hardware resources by using a resource controller thereof, to guarantee a number of tasks that a single chip can perform at the same time, thereby preventing workloads of the chip from exceeding the load thereof. For example, the processor first sends a work request to the resource controller, and the resource controller determines whether the resource quantity is sufficient. If the resource quantity is sufficient, the resource controller sends a right of use to the processor that sends the work request, and the processor can work after obtaining the right of use and returns the right of use to the resource controller upon completion of the work. A number of the above rights of use is equivalent to a number of resources, and a size of a memory occupied by each right of use in the resource controller is proportional to the number of resources. Therefore, as the multi-tasking capability of a single chip becomes stronger, the number of rights of use and the memory occupied by each right of use become larger, and more memories are required to store these rights of use, which causes huge storage costs.

SUMMARY

In view of the above, the present invention provides a multi-tasking chip and a resource control management method thereof, to reduce great occupation of a memory by the right of use.

In some embodiments, a multi-tasking chip includes a plurality of control circuits and a resource controller. Each of the control circuits is configured to send a work request, execute a work procedure according to an authorization code corresponding to the work procedure, and generate a completion signal corresponding to the authorization code after the work procedure is completed. The resource controller is coupled to the control circuit. The resource controller includes a storage circuit, a processor circuit, and a conversion circuit. The storage circuit stores a plurality of index values, where each of the index values has one bit and is associated with one of the authorization codes. The processor circuit is coupled to the storage circuit. The processor circuit updates, according to each of the completion signals, a status of the index value associated with the authorization code corresponding to the work procedure. The conversion circuit is coupled to the storage circuit and the processor circuit. The conversion circuit is configured to, in response to each of the work requests, output, when a status of at least one of the index values is resource-available, an authorization code associated with one of the index values whose status is resource-available, and output no authorization code when a status of none of the index values is resource-available.

In some embodiments, the resource control management method for multi-tasking includes: sending, by each of the control circuits, a work request; storing, by a storage circuit of the resource controller, a plurality of index values, where each of the index values has one bit and is associated with one of a plurality of authorization codes; responding, by a conversion circuit of the resource controller, to each of the work requests; outputting, by the conversion circuit when a status of at least one of the index values is resource-available, the authorization code associated with one of the index values whose status is resource-available to the control circuit corresponding to the corresponding work request to which a response is made; stopping, by the conversion circuit, outputting any authorization code when the status of none of the index values is resource-available; executing, by the control circuit receiving the authorization code, a work procedure according to an authorization code corresponding to the work procedure; generating, by the corresponding control circuit, a completion signal corresponding to the authorization code after the work procedure is completed; and updating, by a processor circuit of the resource controller according to each of the completion signals, a status of the index value associated with the authorization code corresponding to the work procedure.

Therefore, according to some embodiments, the index value stored via the resource controller has one bit, to greatly reduce storage costs. Each of the index values of the resource controller only needs a single bit, and the manufacturing cost of the entire resource controller is greatly reduced. According to some embodiments, the conversion circuit is configured to convert the index values with only a single bit into different authorization codes, respectively. When receiving the request sent by the control circuit, the resource controller selects an available index value and controls the conversion circuit to convert the available index value into a corresponding authorization code, and the control circuit sending the request executes the work according to the corresponding authorization code, in this way, the chip can have the multi-tasking capability. Therefore, the resource controller can achieve the effects of resource control management and storage cost reduction via only one-bit index value and the conversion circuit. Compared with the prior art, a size of a memory for storing available resources in the resource controller will be greatly reduced.

DETAILED DESCRIPTION

Figure 1:
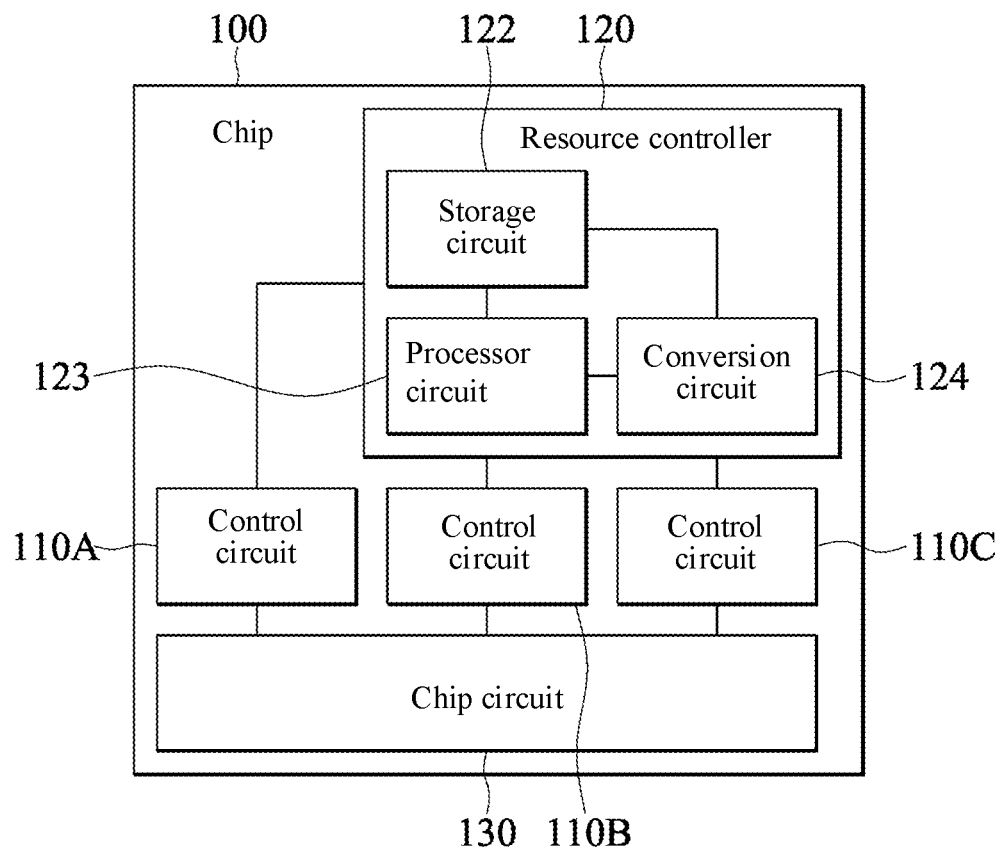
FIG. 1 illustrates a schematic block diagram of a multi-tasking chip according to some embodiments of the present invention.

Referring to FIG. 1, FIG. 1 illustrates a schematic block diagram of a multi-tasking chip 100 according to some embodiments of the present invention. In some embodiments, the multi-tasking chip 100 includes a plurality of control circuits 110A-110C and a resource controller 120. The control circuits 110A-110C are coupled to the resource controller 120. In some embodiments, the multi-tasking chip 100 includes a plurality of control circuits 110A-110C, a resource controller 120, and a chip circuit 130. The control circuits 110A-110C are coupled to the resource controller 120 and the chip circuit 130. In some embodiments, the coupling between internal elements (for example, the control circuits 110A-110C, the resource controller 120, and the chip circuit 130) of the chip 100 is, for example, but not limited to, a control signal, a data bus, and an address bus (an external bus). Generally, there are a plurality of control circuits 110A-110C, but the present invention is not limited thereto.

The chip 100 is a chip having the control circuits 110A-110C and the resource controller 120, for example, but not limited to a System on a chip (SOC). In some embodiments, the chip 100 is a system chip having a central processing unit, a graphics processing unit (GPU), an image processing unit, and a memory resource controller. The control circuits 110A-110C may be the central processing unit, the GPU, and the image processor, respectively, and the resource controller 120 may be a memory resource controller. The chip circuit 130 is a circuit of the chip 100 in addition to the control circuits 110A-110C and the resource controller 120, for example, but not limited to a power management circuit, a peripheral interface circuit, a bus, a specific function circuit, an input/output port, a data compressor, a direct memory access (DMA) controller, and the like.

In some embodiments, the resource controller 120 includes a storage circuit 122, a processor circuit 123, and a conversion circuit 124. The resource controller 120 is configured to control a quantity of available resources of the chip 100, and when there are available resources, authorize the control circuits 110A-110C to execute a work procedure to control operation of the chip circuit 130 (described in detail later). The storage circuit 122 is a memory inside the resource controller 120, but the present invention is not limited thereto. In some embodiments, the storage circuit 122 may be a memory outside the resource controller 120, and the resource controller 120 is coupled to the storage circuit 122. The processor circuit 123 is coupled to the storage circuit 122 and the conversion circuit 124. The conversion circuit 124 is coupled to the storage circuit 122 and the processor circuit 123. In some embodiments, the coupling between internal elements (for example, the storage circuit 122, the processor circuit 123, and the conversion circuit 124) of the resource controller 120 is, for example, but not limited to, a data bus and an address bus (an internal bus).

Each of the control circuits 110A-110C is configured to send a work request. Specifically, each of the control circuits 110A-110C respectively sends a work request to the resource controller 120 according to work requirements thereof. For example, when the first control circuit 110A has a work requirement, the first control circuit 110A sends a work request to the resource controller 120. When the third control circuit 110C has a work requirement, the third control circuit 110C sends a work request to the resource controller 120. The work request may be a level signal or an instruction, for example, but not limited to a high-level signal and/or a low-level signal, a reduced instruction set (RISC), a complex instruction set (CISC), and/or the like.

Figure 2:
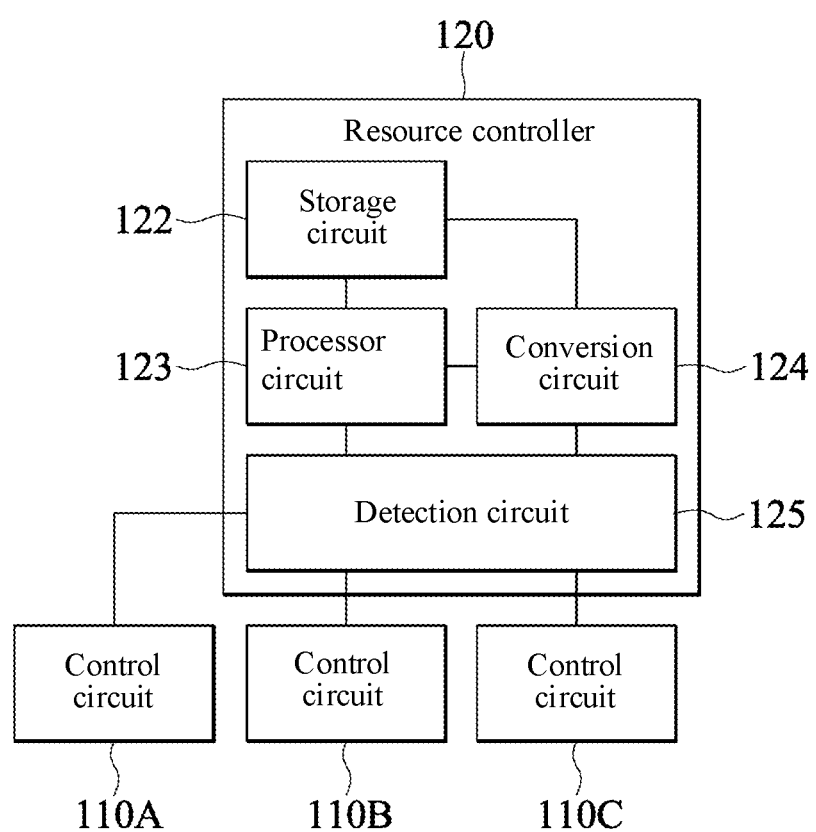
FIG. 2 illustrates a schematic block diagram of a resource controller according to some embodiments of the present invention.

The conversion circuit 124 of the resource controller 120 is configured to respond to each of the work requests. Specifically, the conversion circuit 124 is started in response to each of the work requests. For example, when the first control circuit 110A sends a work request to the resource controller 120, the conversion circuit 124 is started in response to the work request from the first control circuit 110A. When the third control circuit 110C sends a work request to the resource controller 120, the conversion circuit 124 is started in response to the work request from the third control circuit 110C. In some embodiments, as shown in FIG. 2, FIG. 2 illustrates a schematic block diagram of a resource controller 120 according to some embodiments of the present invention. The resource controller 120 further includes a detection circuit 125 coupled to the control circuits 110A-110C and a conversion circuit 124, and the detection circuit 125 is configured to detect work requests from the control circuits 110A-110C, and send a start signal to the conversion circuit 124 when detecting the work request, so that the conversion circuit 124 is started in response to the start signal. The detection circuit 125 may be a signal receiver.

Figures 3, 4:
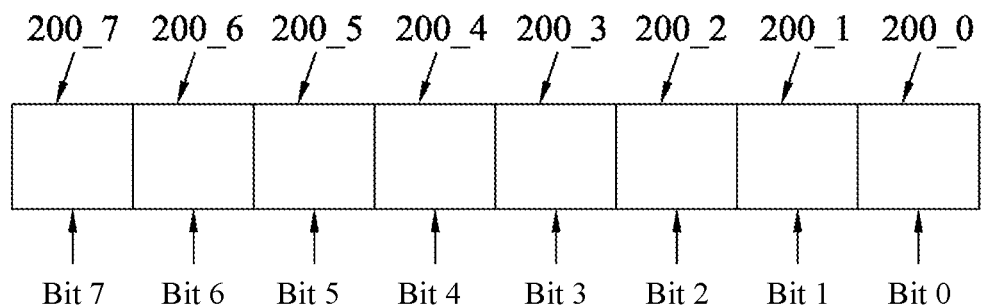
FIG. 3 illustrates a schematic diagram of a set of bits formed by combining index values according to some embodiments of the present invention.
FIG. 4 illustrates a schematic diagram of a comparison table of a conversion circuit according to some embodiments of the present invention.

Referring to FIG. 3, FIG. 3 illustrates a schematic diagram of a set of bits formed by combining index values 200_0-200_7 according to some embodiments of the present invention. A storage circuit 122 is configured to store a plurality of index values 200_0-200_7. The storage circuit 122 may be, but is not limited to, any one or a combination of a static random access memory (SRAM), an instruction register, an address register, a general-purpose register, a flag register, and a cache memory. The data stored in the storage circuit 122 is for the resource controller 120 to control available resources of the chip 100 and authorize the control circuits 110A-110C to execute the work procedure. In some embodiments, the storage circuit 122 further stores an address parameter corresponding to each of the index values 200_0-200_7.

Each of the index values 200_0-200_7 has one bit. A number of the index values 200_0-200_7 is equivalent to a number of the resources of the chip 100, that is, the larger number of resources of the chip 100 leads to the larger number of index values 200_0-200_7. A status of the index values 200_0-200_7 is divided into "resource-available" (available resources) and "resource-unavailable" (no resources available) depending on whether the resources are available. After the chip 100 is initialized (that is, before all the control circuits 110A-110C send any work request), the status of all the index values 200_0-200_7 is "resource-available". When the chip 100 starts to operate, the status of some index values 200_0-200_7 becomes "resource-unavailable", which means that some resources of the chip 100 are used, and the status of the remaining index values 200_0-200_7 is "resource-available". When the chip 100 operates under full load, the status of all the index values 200_0-200_7 is "resource-unavailable".

In some embodiments, as shown in FIG. 3, the index values 200_0-200_7 may be combined into a set of bits. For example, if there are eight index values 200_0-200_7, the index values may be combined into a set of eight bits.

In some embodiments, the index values 200_0-200_7 may be logic values or digital signals. In some embodiments, when the index values 200_0-200_7 are resource-available, the index values 200_0-200_7 are logic values 1 or digital signals 1. When the index values 200_0-200_7 are resource-unavailable, the index values 200_0-200_7 are logic values 0 or digital signals 0, which is not limited thereto. In other embodiments, when the index values 200_0-200_7 are resource-available, the index values 200_0-200_7 are logic values 0 or digital signals 0. When the index values 200_0-200_7 are resource-unavailable, the index values 200_0-200_7 are logic values 1 or digital signals 1.

Each of the index values 200_0-200_7 is associated with an authorization code, and the resource controller 120 sends, in response to the work request sent by the control circuit (110A used as an example), authorization codes associated with the index values 200_0-200_7 whose status is resource-available (resource-available index values for short) to the first control circuit 110A when the status of at least one of the index values 200_0-200_7 is resource-available, and the first control circuit 110A performs the task according to the authorization code.

Specifically, the conversion circuit 124 of the resource controller 120 outputs, in response to each of the work requests, when a status of at least one of the index values 200_0-200_7 is resource-available, the authorization code associated with one of the index values 200_0-200_7 whose status is resource-available, and outputs no authorization code when the status of none of the index values 200_0-200_7 is resource-available. For example, the conversion circuit 124 determines, in response to the work request from the first control circuit 110A, the status of the index values 200_0-200_7, and outputs, to the first control circuit 110A when the status of at least one of the index values 200_0-200_7 is resource-available (for example, the second index value 200_1 and the fourth index value 200_3), the authorization code associated with one (200_1) of the index values (200_1, 200_3) whose status is resource-available. When detecting, in response to the work request from the third control circuit 110C, that there is still an index value (the fourth index value 200_3) whose status is resource-available, the conversion circuit 124 outputs, to the third control circuit 110C, an authorization code associated with one (the fourth index value 200_3) of the index values whose status is resource-available. If the status of none of the index values 200_0-200_7 is resource-available, the conversion circuit 124 outputs no authorization code to any of the control circuits 110A-110C. The authorization code is, for example, but not limited to, a logic value, a serial number, a digital signal, or the like.

Referring to FIG. 3 and FIG. 4 together, FIG. 4 illustrates a schematic diagram of a comparison table 300 of a conversion circuit 124 according to some embodiments of the present invention. In some embodiments, a number of bits of an authorization code is greater than a number of bits of index values 200_0-200_7. As shown in FIG. 4, the authorization code has three bits, and the index values 200_0-200_7 has one bit, which indicates that the chip 100 has eight multi-tasking resources available. In some embodiments, the number of logic values that can be formed by combining the number of bits of the authorization code is the number of index values 200_0-200_7. For example, the number of index values 200_0-200_7 is 256, the number of bits of the authorization code is eight, and the number of logic values that can be combined is 256 (that is, the number of authorization codes is 256). In some embodiments, the authorization codes all have the same number of bits.

After receiving the authorization code, the control circuits 110A-110C execute a work procedure according to an authorization code corresponding to the work procedure. In some embodiments, the control circuits 110A-110C execute a work procedure according to an authorization code corresponding to the work procedure, to control operation of a chip circuit 130. For example, the control circuits 110A-110C receiving the authorization code transmit the authorization code, a header, and an instruction to the chip circuit 130, and the chip circuit 130 performs, in response to the authorization code and the header, a corresponding operation according to the instruction. Herein, the header represents a state that the work procedure is being executed. In some embodiments, the header may have product serial numbers corresponding to the control circuits 110A-110C, and the like.

After the work procedure is completed, the control circuits 110A-110C generate a completion signal corresponding to the authorization code, and send the completion signal to the resource controller 120, which indicates that: the control circuits 110A-110C complete the work procedure, and will return the authorized resources to the chip 100. The completion signal may be an authorization code including the corresponding work procedure and a header. To this end, the header represents a state that the work procedure is completed.

A processor circuit 123 of the resource controller 120 updates, according to each of the completion signals from the control circuits 110A-110C, a status of the index values 200_0-200_7 associated with the authorization code corresponding to the work procedure. For example, the processor circuit 123 obtains the completion signal from the first control circuit 110A, and confirms, according to the header of the completion signal, that the work procedure of the first control circuit 110A is completed, and further confirms that the first control circuit 110A is to return resources to the chip 100. The processor circuit 123 updates, according to the authorization code (that is, the authorization code corresponding to the completed work procedure, for example, the authorization code corresponding to the completed work procedure of the first control circuit 110A) of the completion signal, the status of the index values 200_0-200_7 associated with the authorization code (that is, the authorization code corresponding to the completed work procedure) in the storage circuit 122, to complete the procedure of returning resources to the chip 100 by the first control circuit 110A.

In some embodiments, the processor circuit 123 updates, according to each of the completion signals from the control circuits 110A-110C, the status of the index values 200_0-200_7 associated with the authorization code corresponding to the work procedure from resource-unavailable to resource-available. That is, the control circuits 110A-110C return the resources to the chip 100. For example, the processor circuit 123 obtains, through the conversion circuit 124, the index values 200_0-200_7 associated with the authorization code of each of the completion signals from the control circuits 110A-110C, and updates the status of the obtained index values 200_0-200_7 from resource-unavailable to resource-available in the storage circuit 122. In some embodiments, the processor circuit 123 searches the comparison table 300 (as shown in FIG. 4) according to the authorization code of each of the completion signals through the conversion circuit 124, to obtain the index values 200_0-200_7 associated with the authorization code of each of the completion signals. In some embodiments, as shown in FIG. 2, the detection circuit 125 is further coupled to the processor circuit 123, and the processor circuit 123 receives each of the completion signals from the control circuits 110A-110C through the detection circuit 125.

Therefore, in some embodiments, the resource controller 120 controls the number of available resources of the chip 100 via the index values 200_0-200_7, and converts, into authorization codes through the conversion circuit 124 when there are available resources, the index values 200_0-200_7 whose status is resource-available, to authorize the control circuits 110A-110C (to output, to the corresponding control circuits 110A-110C, the authorization codes associated with the index values 200_0-200_7 whose status is resource-available), so that the control circuits 110A-110C execute the work procedure to control the operation of the chip circuit 130, and return the resources to the chip 100 after the work procedure is completed.

In some embodiments, the resource controller 120 can control the resources of the chip 100 via each of the index values 200_0-200_7 with only a single bit and a conversion circuit 124, so that the chip 100 has the multi-tasking capability, thereby achieving the effect of reducing storage costs. For example, if the conventional resource control technology is used, for example, the chip 100 directly stores the authorization code in the storage circuit 122 (for example, the chip has 256 available resources and directly stores 256 8-bit authorization codes in the storage circuit 122), huge storage costs (for example, 2,048 bits (obtained by multiplying 256 by 8 bits) are occupied) may be caused, and a size of a memory occupied by each of the authorization codes in the resource controller 120 is proportional to the number of resources. Therefore, stronger multi-tasking capability of the chip 100 leads to a larger number of authorization codes and more space occupation of the memory by each of the authorization codes. Alternatively, for example, four resource controllers 120 controlling 64 resources, four resource controllers 120 controlling 128 resources, three resource controllers 120 controlling 256 resources, two resource controllers 120 controlling 512 resources, one resource controller 120 controlling 768 resources, and one resource controller 120 controlling 1,024 resources are integrated, and the storage space required by the memory is 117,481 square micro meters ($\mu m^2$). Accordingly, the resource controller 120 stores the index values 200_0-200_7 with only a single bit through the storage circuit 122 and the conversion circuit 124. Compared with the conventional art, the memory storage space may be reduced by at least 30%, for example, only a memory (obtained by multiplying one bit by 256 index values 200_0-200_7) with 256 bits is occupied, and when the multi-tasking capability of the chip 100 is stronger, compared with the conventional technology, the occupied memory capacity may be reduced greatly. Alternatively, for example, the resource controllers 120 in the foregoing example are integrated, the required memory storage space may be reduced to 32,166 square micrometers ($\mu m^2$).

In some embodiments, the processor circuit 123 changes the status of the index values 200_0-200_7 associated with the current outputted authorization codes to resource-unavailable when the conversion circuit 124 outputs the authorization code. When outputting the authorization code to the control circuits 110A-110C, the conversion circuit 124 sends a state control signal to the processor circuit 123. The processor circuit 123 is started according to the state control signal, and changes, from resource-available to resource-unavailable in the storage circuit 122, the status of the index values 200_0-200_7 associated with the current outputted authorization codes by the conversion circuit 124. That is, after sending resources to the control circuits 110A-110C, the resource controller 120 changes the status of the index values 200_0-200_7 to resource-unavailable. The state control signal can be a high-level signal or a low-level signal.

In some embodiments, each of the control circuits 110A-110C sends a work request at a different time point. For example, after the first control circuit 110A sends the work request, the second control circuit 110B sends a work request at a time point of ten microseconds later than the first control circuit 110A, and the third control circuit 110C sends a work request at a time point of ten microseconds later than the second control circuit 110B, but the present invention is not limited thereto. In some embodiments, each of the control circuits 110A-110C may send a work request according to a clock signal thereof, and since each of the control circuits 110A-110C may send the work request according to work requirements thereof, the time points at which each of the control circuits 110A-110C sends a work request may be the same or different. In some embodiments, after the work procedure is completed, each of the control circuits 110A-110C generates a completion signal corresponding to the authorization code, and sends another work request to the resource controller 120 if there are still work requirements.

In some embodiments, the conversion circuit 124 is a logic circuit with one or more input terminals and one or more output terminals. The input terminal of the conversion circuit 124 is coupled to the storage circuit 122, and outputs at least one logic result at the output terminal of the conversion circuit 124 when it is detected that the status of at least one of the index values 200_0-200_7 is resource-available, that is, after the index values 200_0-200_7 are input to the logic circuit through the input terminals, the authorization code (the logic result) is output at the output terminal. The logic circuit may be but is not limited to a logic gate, or a combination of a plurality of logic gates. The logic gate is, for example, but not limited to, an inverter, an AND gate, an OR gate, an exclusive OR gate, a buffer gate, or other logic gates. The logic result may be a combination of logic 0 and logic 1. In some embodiments, the input terminal of the conversion circuit 124 is further coupled to the control circuits 110A-110C, to receive and respond to the work requests from the control circuits 110A-110C.

In some embodiments, as shown in FIG. 4, the comparison table 300 respectively associates the index values 200_0-200_7 with different authorization codes. For example, the comparison table 300 respectively associates different index values 200_0-200_7 with authorization codes with different logic values. In some embodiments, the authorization codes in the comparison table 300 all have the same number of bits.

In some embodiments, the conversion circuit 124 of the resource controller 120 detects the status of the index values 200_0-200_7 in response to each of the work requests from the control circuits 110A-110C, when a status of at least one of the index values 200_0-200_7 is resource-available, selects one of the index values 200_0-200_7 whose status is resource-available, obtains the authorization codes associated with the selected index values 200_0-200_7 according to the selected index values 200_0-200_7 and the comparison table 300, and outputs, to the control circuits 110A-110C corresponding to the corresponding work requests to which responses are made, the authorization codes associated with the selected index values 200_0-200_7.

Then, for example, the first control circuit 110A and the third control circuit 110C are used as examples. The third control circuit 110C sends a work request later than the first control circuit 110A, and the conversion circuit 124 first detects the status of the index values 200_0-200_7 in response to the work request from the first control circuit 110A, and when a status of at least one of the index values 200_0-200_7 is resource-available, selects (that is, selects one of the available resources) one of the index values 200_0-200_7 whose status is resource-available, and searches the comparison table 300 according to the selected index values 200_0-200_7, to obtain the authorization codes associated with the selected index values 200_0-200_7. For example, the first index value 200_0 is used as an example. As shown in FIG. 4, the authorization code associated with the first index value 200_0 is the logic value "000". Then, the conversion circuit 124 outputs the authorization codes (for example, outputs logic value "000") associated with the selected index values (for example, the first index value 200_0) to the first control circuit 110A. In response to the work request from the third control circuit 110C after the work request from the first control circuit 110A, when detecting that the status of the index values 200_0-200_7 is still resource-available, the conversion circuit 124 selects another index value (for example, the second index value 200_1 is resource-available, that is, the second index value 200_1 is selected) of the index values 200_0-200_7 whose status is resource-available, searches the comparison table 300, to obtain the authorization code associated with the selected another index value (for example, the second index value 200_1), and outputs, to the third control circuit 110C, the authorization code (for example, outputs logic value "001") associated with the selected another index value (for example, the second index value 200_1).

In some embodiments, the conversion circuit 124 may detect the status of the index values 200_0-200_7 through the combination of one or more logic gates. For example, the resource-available state and the resource-unavailable state are respectively represented by logic [1] and logic [0]. A set of bits formed by combining the index values 200_0-200_7 and a logic value with the same number of bits as the set of bits are input through the input terminal of the conversion circuit 124, the values of the bits of the logic value are all 0, and logic results are output from a plurality of output terminals of the conversion circuit 124 through an OR gate. Each of the output terminals corresponds to each of the index values 200_0-200_7, and the conversion circuit 124 detects the logic result of the output terminal to obtain the status of the index values 200_0-200_7. For example, if the logic result of the output terminal is 1, it indicates that the index value 200_0-200_7 corresponding to the output terminal is resource-available. If the logic result of the output terminal is 0, it indicates that the index value 200_0-200_7 corresponding to the output terminal is resource-unavailable, but the present invention is not limited thereto. The status of the index values 200_0-200_7 may be detected through other logic gates or by inputting other logic values at the input terminal of the conversion circuit 124.

In some embodiments, the comparison table 300 may be implemented by a logic circuit. For example, the logic circuit for implementing the comparison table 300 has a plurality of input terminals and a plurality of output terminals. The input terminals respectively correspond to the index values 200_0-200_7 and have a detection function, and when it is detected that the logic value is 1, a preset logic result is output via the plurality of output terminals. When it is detected that the logic value is 1 at different input terminals, corresponding different preset logic results are output via the plurality of output terminals. However, the present invention is not limited thereto. The preset logic result may be output when it is detected that the logic value of the input terminal is 0.

Figure 5:
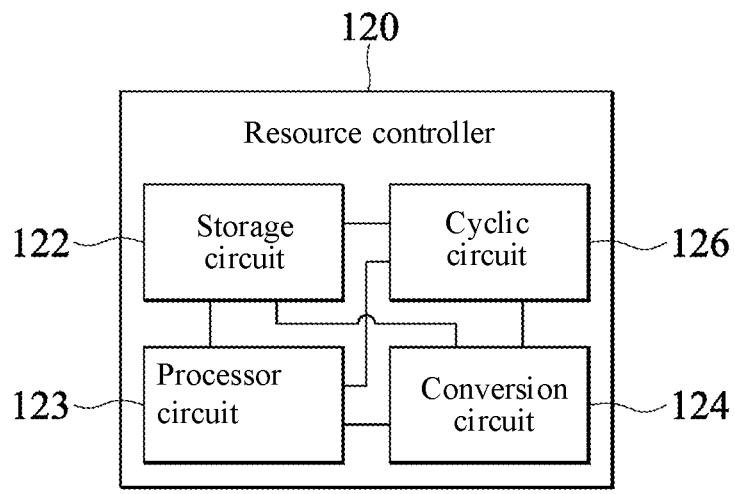
FIG. 5 illustrates a schematic block diagram of a resource controller according to some embodiments of the present invention.

Referring to FIG. 5, FIG. 5 illustrates a schematic block diagram of a resource controller 120 according to some embodiments of the present invention. The resource controller 120 further includes a cyclic circuit 126 coupled to the storage circuit 122 and the conversion circuit 124. The conversion circuit 124 detects the status of the index values 200_0-200_7 in response to each of the work requests from the control circuits 110A-110C. In addition, if the status of at least one of the index values 200_0-200_7 is resource-available, the conversion circuit 124 cyclically selects, through the cyclic circuit 126, one of the index values 200_0-200_7 whose status is resource-available. For example, when confirming, in response to the work request, that the status of at least one of the index values 200_0-200_7 is resource-available, the conversion circuit 124 of the resource controller 120 selects, through the cyclic circuit 126 from the set of bits formed by combining the index values 200_0-200_7 of the storage circuit 122, the index values 200_0-200_7 that are in a resource-available state and with which the associated authorization codes are output to the control circuits 110A-110C for a smaller number of times compared to other index values 200_0-200_7 whose status is resource-available, so that a circular mode is formed to evenly allocate all the resources of the chip 100 for use.

Then, for example, if the index values 200_0-200_7 all are in the resource-available status, and the number of times the authorization code associated with the first index value 200_0 is output to the control circuits 110A-110C is less than that of other index values 200_1 to 200_7 (for example, the second index value 200_1 to the eighth index value 200_7), the conversion circuit 124 selects the first index value 200_0 through the cyclic circuit 126. In some embodiments, if the authorization code associated with each of the index values 200_0-200_7 whose status is resource-available is output to the control circuits 110A-110C for the same number of times, the conversion circuit 124 randomly selects, through the cyclic circuit 126, one of the index values 200_0-200_7 whose status is resource-available. For example, the conversion circuit 124 randomly selects, via a random function through the cyclic circuit 126, one of the index values 200_0-200_7 whose status is resource-available. In some embodiments, the cyclic circuit 126 may be implemented by a logic circuit formed by combining one or more logic gates. In some embodiments, the storage circuit 122 stores the number of times each of the authorization codes is output to the control circuits 110A-110C.

Figure 6:
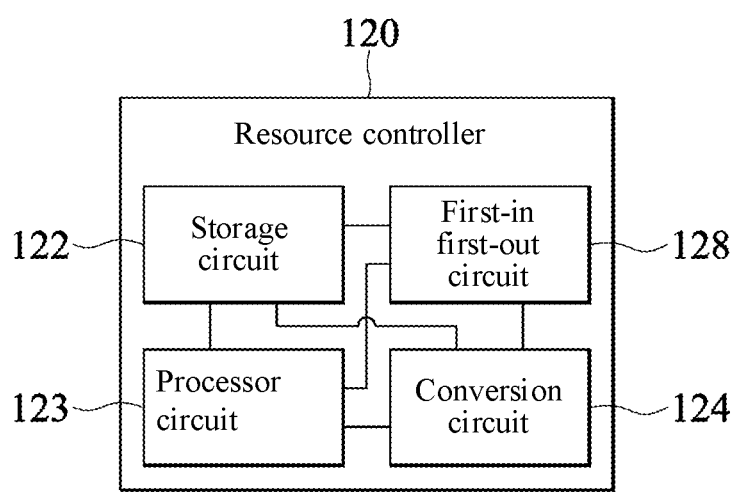
FIG. 6 illustrates a schematic block diagram of a resource controller according to some embodiments of the present invention.

Referring to FIG. 6, FIG. 6 illustrates a schematic block diagram of a resource controller 120 according to an embodiment of the present invention. The resource controller 120 further includes a first-in first-out circuit 128 coupled to the storage circuit 122 and the conversion circuit 124. The conversion circuit 124 detects the status of the index values 200_0-200_7 in response to each of the work requests from the control circuits 110A-110C. In addition, if the status of at least one of the index values 200_0-200_7 is resource-available, the conversion circuit 124 selects, in a first-in first-out manner through the first-in first-out circuit 128, one of the index values 200_0-200_7 whose status is resource-available. For example, each of the index values 200_0-200_7 corresponds to an address parameter, and the address parameter corresponding to each of the index values 200_0-200_7 whose status is resource-available is stored in the storage circuit 122 in a stacking manner. When confirming, in response to the work request, that the status of at least one of the index values 200_0-200_7 is resource-available, the conversion circuit 124 of the resource controller 120 selects, from the storage circuit 122 through the first-in first-out circuit 128, compared to other address parameters, the index values 200_0-200_7 corresponding to the stacked address parameters first stored in (entering) the storage circuit 122. After the conversion circuit 124 outputs the authorization code associated with the selected index values 200_9-200_7, the address parameters corresponding to the selected index values 200_0-200_7 are cleared from the stack of the storage circuit 122. When the processor circuit 123 updates the status of the index values 200_0-200_7 according to the completion signal, the processor circuit 123 controls the storage circuit 122, and stores the address parameters corresponding to the updated index values 200_0-200_7 in the stack of the storage circuits 122 through the first-in first-out circuit 128, so that a first-in first-out method is formed.

Then, for example, if in the stack of the storage circuit 122, compared with the address parameters corresponding to other index values 200_1 to 200_6 (the second index value 200_1 to the seventh index value 200_6), the address parameter corresponding to the first index value 200_0 is first stored in (entering) the stack of the storage circuit 122, the conversion circuit 124 selects the first index value 200_0 through the first-in first-out circuit 128. After the authorization code associated with the first index value 200_0 is output by the conversion circuit 124, the conversion circuit 124 clears the address parameter corresponding to the first index value 200_0 from the stack of the storage circuit 122 through the first-in first-out circuit 128. When the processor circuit 123 updates the status of the eighth index value 200_7 according to the completion signal, the processor circuit 123 stores the address parameter corresponding to the eighth index value 200_7 in the stack of the storage circuit 122. In some embodiments, the first-in first-out circuit 128 may be implemented by a logic circuit formed by combining one or more logic gates.

Figure 7:
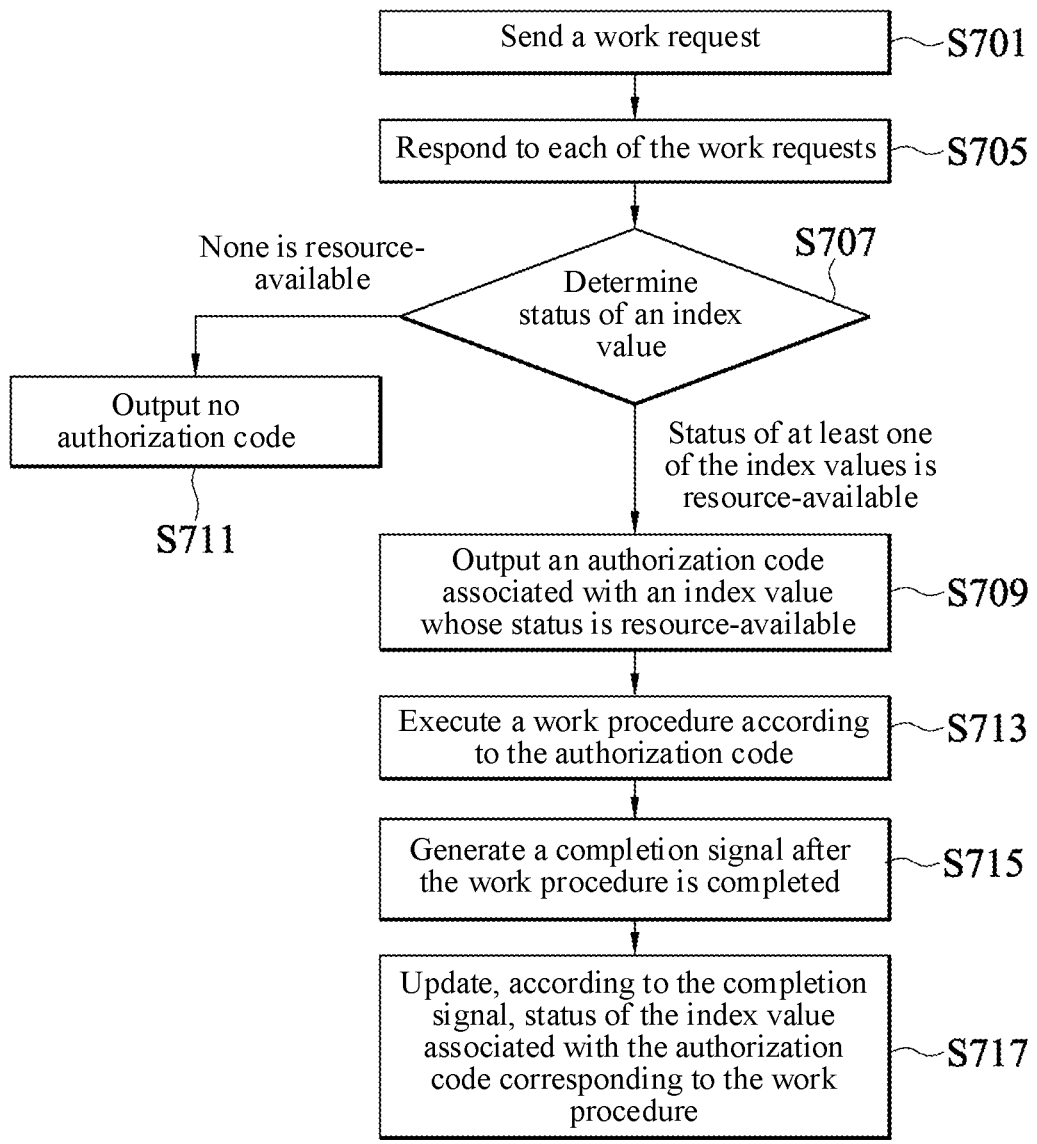
FIG. 7 illustrates a schematic flowchart of a resource control management method for multi-tasking according to some embodiments of the present invention.

Referring to FIG. 1 and FIG. 7, FIG. 7 illustrates a schematic flowchart of a resource control management method for multi-tasking according to some embodiments of the present invention. In some embodiments, a resource control management method for multi-tasking is adapted to a chip 100. The chip 100 includes a plurality of control circuits 110A-110C and a resource controller 120. The resource control management method for multi-tasking includes the following steps.

Step S701: Each of the control circuits 110A-110C sends a work request according to work demands.

Step S705 and S707: The resource controller 120 or a conversion circuit 124 thereof determines a status of index values 200_0-200_7 in response to each of the work requests, where the resource controller 120 or a storage circuit 122 thereof stores a plurality of index values 200_0-200_7, and each of the index values 200_0-200_7 has one bit and is associated with one of a plurality of authorization codes.

Step S709: When a status of at least one of the index values 200_0-200_7 is resource-available, the resource controller 120 or the conversion circuit 124 thereof outputs, to the corresponding control circuits 110A-110C corresponding to the work request to which a response is made, the authorization code associated with one of the index values 200_0-200_7 whose status is resource-available.

Step S711: When the status of the index values 200_0-200_7 is resource-unavailable, the resource controller 120 or the conversion circuit 124 thereof outputs no authorization code.

Step S713: After receiving the authorization code, the control circuits 110A-110C execute a work procedure according to an authorization code corresponding to the work procedure.

Step S715: The corresponding control circuits 110A-110C generate a completion signal corresponding to the authorization code after the work procedure is completed.

Step S717: The resource controller 120 or a processor circuit 123 of the resource controller 120 updates, according to each of the completion signals, the status of the index values 200_0-200_7 associated with the authorization code corresponding to the work procedure (the work procedure corresponding to the completion signal) in the storage circuit 122.

In some embodiments, the step of sending the work request in step S701 of the resource control management method for multi-tasking further includes: sending, by each of the control circuits 110A-110C, a work request at a different time point. In other embodiments, each of the control circuits 110A-110C may send the work request at a same time point. In some embodiments, the step of sending the work request in step S701 of the resource control management method for multi-tasking further includes: generating, by the control circuits 110A-110C after the work procedure is completed, the completion signal corresponding to the authorization code through the corresponding control circuits 110A-110C, and sending another work request (that is, a new work request corresponding to the new work procedure, which is different from the work request corresponding to the completed work procedure).

In some embodiments, the chip 100 further includes a chip circuit 130, and the step of executing a work procedure of step S713 of the resource control management method for multi-tasking further includes: executing, by the control circuits 110A-110C receiving the authorization codes, the work procedure according to an authorization code corresponding to the work procedure, to control operation of the chip circuit 130.

In some embodiments, step S709 of outputting the authorization code of the resource control management method for multi-tasking further includes: when the conversion circuit 124 outputs the authorization code, changing, by the resource controller 120 or the processor circuit 123 thereof, from resource-available to resource-unavailable, the status of the index values 200_0-200_7 associated with the current outputted authorization codes. In some embodiments, step S717 of updating the status of the index values 200_0-200_7 of the resource control management method for multi-tasking further includes: updating, by the resource controller 120 or the processor circuit 123 thereof according to each of the completion signals, from resource-unavailable to resource-available, the status of the index values 200_0-200_7 associated with the authorization code corresponding to the work procedure.

In some embodiments, the conversion circuit 124 has a comparison table 300, and the comparison table 300 respectively associates the index values 200_0-200_7 with different authorization codes. The steps of determining the status of the index values 200_0-200_7 and outputting the authorization code of step S705 to step S711 of the resource control management method for multi-tasking further include: detecting, by the resource controller 120 or the conversion circuit 124 thereof, the status of the index values 200_0-200_7 in response to each of the work requests; selecting, by the resource controller 120 or the conversion circuit 124 thereof when the status of at least one of the index values 200_0-200_7 is resource-available, one of the index values 200_0-200_7 whose status is resource-available; and obtaining, by the resource controller 120 or the conversion circuit 124 thereof, the authorization codes associated with the selected index values 200_0-200_7 according to the selected index values 200_0-200_7 and the comparison table 300 and outputting, to the control circuits 110A-110C corresponding to the corresponding work requests to which responses are made, the authorization codes associated with the selected index values 200_0-200_7.

In some embodiments, the step of selecting, by the conversion circuit 124, one of the index values 200_0-200_7 whose status is resource-available of the resource control management method for multi-tasking further includes: cyclically selecting, by the resource controller 120 or the conversion circuit 124 thereof through the cyclic circuit 126 of the resource controller 120, one of the index values 200_0-200_7 whose status is resource-available.

In some embodiments, the step of selecting, by the conversion circuit 124, one of the index values 200_0-200_7 whose status is resource-available of the resource control management method for multi-tasking further includes: selecting, by the resource controller 120 or the conversion circuit 124 thereof in a first-in first-out manner through a first-in first-out circuit 128 of the resource controller 120, one of the index values 200_0-200_7 whose status is resource-available.

Therefore, according to some embodiments, the index value stored via the resource controller has one bit, to greatly reduce storage costs. Each of the index values of the resource controller only needs a single bit, and the manufacturing cost of the entire resource controller is greatly reduced. According to some embodiments, the conversion circuit is configured to convert the index values with only a single bit into different authorization codes, respectively. When receiving the request sent by the control circuit, the resource controller selects an available index value and controls the conversion circuit to convert the available index value into a corresponding authorization code, and the control circuit sending the request executes the work according to the corresponding authorization code. In this way, the chip can have the multi-tasking capability. Therefore, the resource controller can achieve the effects of resource control management and storage cost reduction via only one-bit index value and the conversion circuit. Compared with the prior art, a size of a memory for storing available resources in the resource controller will be greatly reduced.

What is claimed is:

1. An integrated circuit, comprising:
    a plurality of control circuits, wherein each of the control circuits sends a work request, execute a work procedure according to an authorization code corresponding to the work procedure, and generate a completion signal corresponding to the authorization code after the work procedure is completed; and
    a resource controller coupled to the control circuits comprising:
        a storage circuit stores a plurality of index values, wherein each of the index values is associated with one of the authorization codes;
        a processor circuit coupled to the storage circuit and updates, according to each of the completion signals, a status of the index value associated with the authorization code corresponding to the work procedure; and
        a conversion circuit coupled to the storage circuit and the processor circuit, and in response to each of the work requests, outputs, when the status of at least one of the index values is resource-available, the authorization code associated with the index value having a status that is resource-available, and output no authorization code when the status of none of the index values is resource-available;
        wherein, the conversion circuit has a comparison table used to respectively associate the index values with different authorization codes, detects the status of each of the index values in response to each of the work requests, selects, when the status of at least one of the index values is resource-available, one of the index values whose status is resource-available, obtains the authorization code associated with the selected index value according to the selected index value and the comparison table, and outputs the authorization code associated with the selected index value to the control circuit corresponding to the corresponding work request to which a response is made;
        wherein, the resource controller further comprises a cyclic circuit coupled to the storage circuit and the conversion circuit, and the conversion circuit cyclically selects, through the cyclic circuit, one of the index values that are resource-available and with which the authorization code is output to the control circuits for a smaller number of times compared to other index values that are resource-available;
    wherein, when the authorization code associated with each of the index values that are resource-available is output to the control circuits for the same number of times, the conversion circuit randomly selects, through the cyclic circuit, one of the index values that are resource-available.

2. The integrated circuit according to claim 1, wherein each of the index values has one bit, and a number of bits of each of the authorization codes is greater than a number of bits of each of the index values.

3. The integrated circuit according to claim 1, wherein when the conversion circuit outputs the authorization code, the processor circuit changes, to resource-unavailable, the status of the index value associated with the current outputted authorization code.

4. The integrated circuit according to claim 1, wherein the processor circuit updates, to resource-available according to each of the completion signals, the status of the index value associated with the authorization code corresponding to the work procedure.

5. The integrated circuit according to claim 1, further comprising a chip circuit coupled to the control circuits, wherein each of the control circuits executes the work procedure according to the authorization code corresponding to the work procedure, to control operation of the chip circuit.

6. The integrated circuit according to claim 1, wherein each of the control circuits sends the work request at a different time point.

7. The integrated circuit according to claim 1, wherein each of the control circuits generates the completion signal corresponding to the authorization code and sends another work request after the work procedure is completed.

8. A resource control management method for multi-tasking, adapted to a chip, wherein the chip comprises a plurality of control circuits and a resource controller, and the resource control management method for multi-tasking comprises:

sending, by each of the control circuits, a work request;

storing, by a storage circuit of the resource controller, a plurality of index values, wherein each of the index values has one bit and is associated with one of a plurality of authorization codes;

responding, by a conversion circuit of the resource controller, to each of the work requests;

outputting, by the conversion circuit when a status of at least one of the index values is resource-available, the authorization code associated with one of the index values whose status is resource-available to the control circuit corresponding to the corresponding work request to which a response is made;

stopping, by the conversion circuit, outputting any authorization code when the status of none of the index values is resource-available;

executing, by the control circuit receiving the authorization code, a work procedure according to the authorization code corresponding to the work procedure;

generating, by the corresponding control circuit, a completion signal corresponding to the authorization code after the work procedure is completed; and updating, by a processor circuit of the resource controller according to each of the completion signals, the status of the index value associated with the authorization code corresponding to the work procedure;

wherein the conversion circuit has a comparison table used to respectively associate the index values with different authorization codes, and the resource control management method for multi-tasking further comprises:

detecting, by the conversion circuit of the resource controller, the status of each of the index values in response to each of the work requests;

selecting, by the conversion circuit when the status of at least one of the index values is resource-available, one of the index values whose status is resource-available;

obtaining, by the conversion circuit according to the selected index value and the comparison table, the authorization code associated with the selected index value; and outputting the authorization code associated with the selected index value to the control circuit corresponding to the corresponding work request to which a response is made wherein the step of selecting, by the conversion circuit when the status of at least one of the index values is resource-available, one of the index values whose status is resource-available further comprises:

cyclically selecting, by the conversion circuit through a cyclic circuit of the resource controller, one of the index values that are resource-available and with which the authorization code is output to the control circuits for a smaller number of times compared to other index values that are resource-available; and randomly selecting, by the conversion circuit through the cyclic circuit, one of the index values that are resource-available when the authorization code associated with each of the index values that are resource-available is output to the control circuits for the same number of times.

9. The resource control management method for multi-tasking according to claim 8, wherein a number of bits of each of the authorization codes is greater than a number of bits of each of the index values.

10. The resource control management method for multi-tasking according to claim 8, further comprising:

changing, to resource-unavailable by the processor circuit of the resource controller when the conversion circuit outputs the authorization code, the status of the index value associated with the current outputted authorization code.

11. The resource control management method for multi-tasking according to claim 8, wherein the step of updating, by the processor circuit of the resource controller according to each of the completion signals, the status of the index value associated with the authorization code corresponding to the work procedure further comprises:

updating, to resource-available according to each of the completion signals, the status of the index value associated with the authorization code corresponding to the work procedure.

12. The resource control management method for multi-tasking according to claim 8, wherein the chip further comprises a chip circuit, and the resource control management method for multi-tasking further comprises:

executing, by the control circuit receiving the authorization code, the work procedure corresponding to the authorization code, to control operation of the chip circuit.

13. The resource control management method for multi-tasking according to claim 8, further comprising:

sending, by each of the control circuits, the work request at a different time point.

14. The resource control management method for multi-tasking according to claim 8, further comprising:

generating, by the corresponding control circuit, the completion signal corresponding to the authorization code, and sending another work request after the work procedure is completed.

* * * * *